United States Patent [19]

Specht

[11] 4,449,737

[45] May 22, 1984

[54] HOSE COUPLER LOCKING ARRANGEMENT

[75] Inventor: Glenn E. Specht, Massillon, Ohio

[73] Assignee: The Hoover Company, North Canton, Ohio

[21] Appl. No.: 376,221

[22] Filed: May 7, 1982

[30] Foreign Application Priority Data

Apr. 21, 1982 [GB] United Kingdom ................ 8211534

[51] Int. Cl.³ .......................... A47L 9/24; F16L 35/00; F16L 5/00
[52] U.S. Cl. .......................................... 285/7; 285/87; 285/360; 285/376; 285/192; 285/209
[58] Field of Search ................ 285/7, 82, 87, 88, 360, 285/376, 396, 401, 402, 209, 192

[56] References Cited

U.S. PATENT DOCUMENTS

| 873,892 | 12/1907 | Petterson | 285/87 |
| 2,315,981 | 4/1943 | Olson | 285/87 X |
| 3,674,287 | 7/1972 | Selley | 285/7 |
| 3,869,751 | 3/1975 | Boyd et al. | 285/7 X |
| 3,874,024 | 4/1975 | Ford | 285/7 X |
| 4,017,937 | 4/1977 | Hanold | 285/376 X |
| 4,129,323 | 12/1978 | Wilson | 285/87 X |

Primary Examiner—Richard J. Scanlan, Jr.
Attorney, Agent, or Firm—Gerald H. Kreske; Richardson B. Farley

[57] ABSTRACT

A hose coupling latching arrangement is disclosed in which a resilient bendable member engages with an abutment to prevent the coupling from turning to a release position.

3 Claims, 6 Drawing Figures

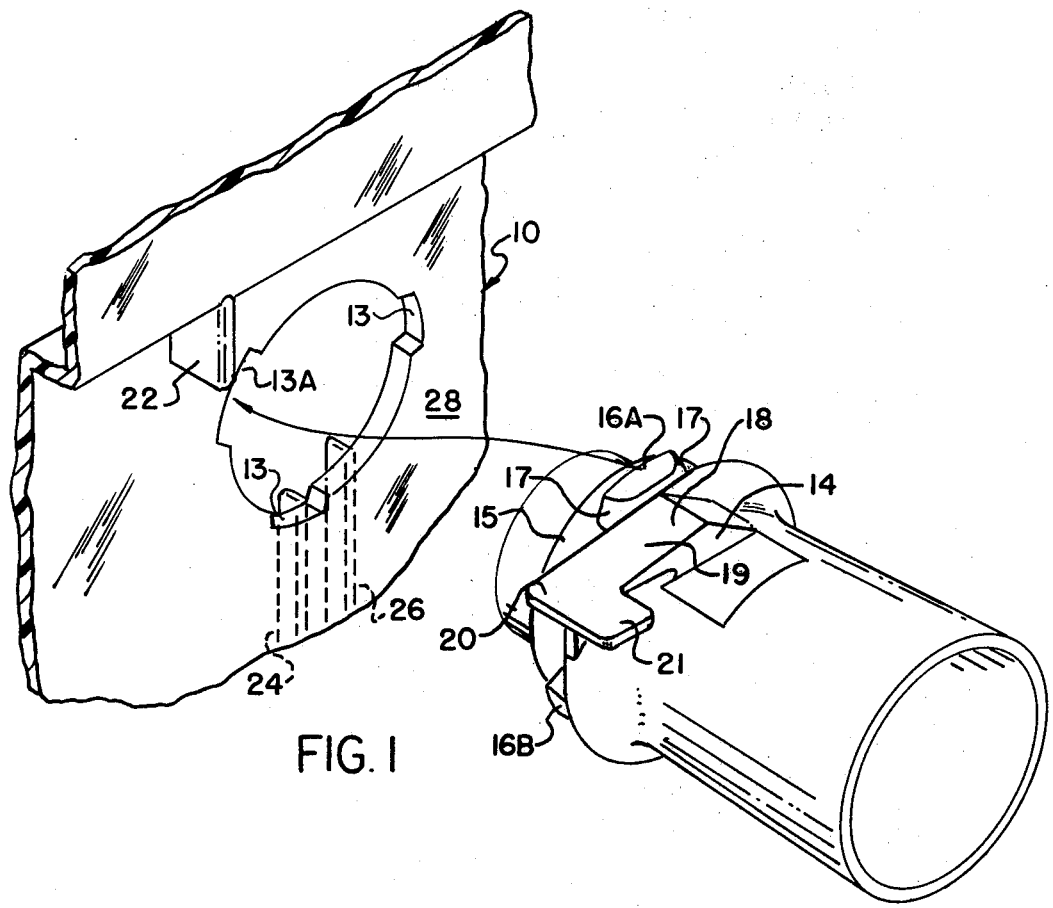
FIG. 1
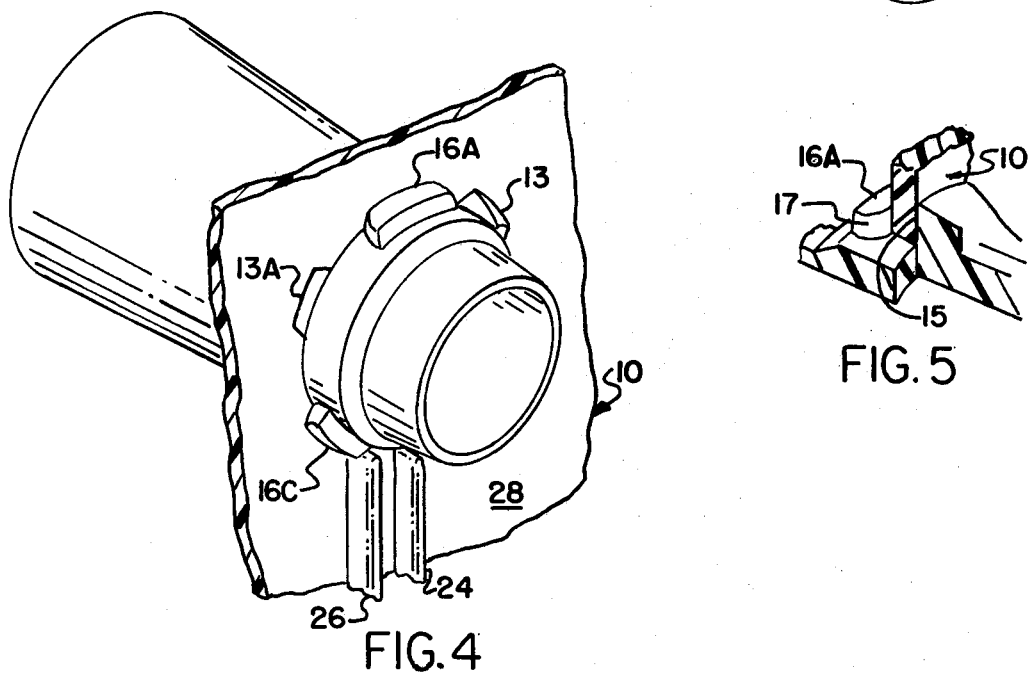
FIG. 4
FIG. 5

HOSE COUPLER LOCKING ARRANGEMENT

BACKGROUND OF THE INVENTION

1. Field of the Invention

This invention relates, generally, to latching arrangements and, more particularly, relates to a hose coupling arrangement for a vacuum cleaner or the like.

2. Description of the Prior Art

Although latching arrangements to prevent hose coupling turning for removal are generally old, and, although integral coupling latches for vacuum cleaners are known, no one heretofore has combined these concepts to advantageously provide an efficient, easily workable and inexpensive latching arrangement for a hose coupling or the like.

Accordingly, it is an object of the invention to provide a coupling with an integral latch which prevents turning movement of the coupling for release.

It is a still further object of the invention to provide a flexible finger on the coupling member which interengages with an abutment on the member being coupled thereto to prevent turning of the coupling member.

It is an additional object of the invention to provide an improved latching arrangement for a hose coupling or the like.

BRIEF DESCRIPTION OF THE INVENTION

In a preferred embodiment of the invention, a coupling member, required to turn for release from the member to which it is attached, correspondingly, includes the alternative of a radially extending flexible finger or an abutment. The finger which, ideally, is situated on and integral with the coupling member then is placed in abutting interference with the abutment on the member which can be a vacuum cleaner shell.

The coupling member, normally a hose coupling, mates in a bayonet fashion with the shell by an inserting and rotation movement. As this occurs the radially extending flexible finger is cammed to a non-interfering position so that it passes by the abutment on the cleaner shell. However, upon passage by the abutment the coupling's rotation is prevented by abutting engagement between the now unbent finger and abutment. This abutting engagement is overcome by rotating the finger end away from the abutment by manual pressure which flexibly bends the latch finger to disengage it, thus permitting the hose coupling to turn for release.

BRIEF DESCRIPTION OF THE DRAWINGS

Reference now may be had to the accompanying drawings for a better understanding of the invention, both as to its organization and function, with the illustration being of a preferred embodiment, but being only exemplary, and in which:

FIG. 1 is a perspective view of a disengaged hose coupler and partial showing of a cleaner;

FIG. 4 is a perspective view of the rear side of the cleaner of FIG. 1, shown fragmentarily, with the coupler engaged;

FIG. 5 is a fragmentary perspective showing one of the bayonet lugs of the coupler in engagement with the cleaner shell.

DETAILED DESCRIPTION OF THE INVENTION

Figure 2:
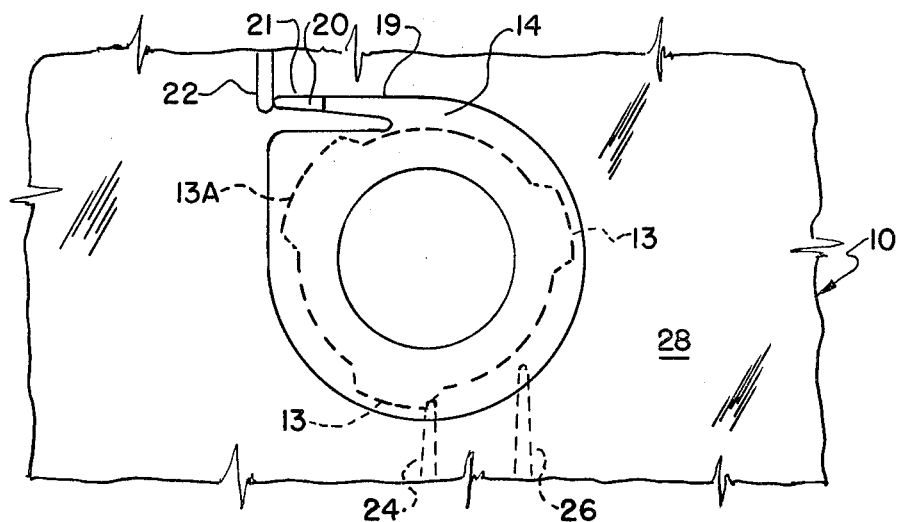
FIG. 2 is a fragmentary plan view in elevation of the cleaner with the coupling inserted and locked.

There is shown fragmentarily in FIG. 1, a floor care appliance 10 which may ideally be a canister cleaner or the like having a motor fan system (not shown) and a dirt collecting bag (not shown) disposed within the floor care appliance 10. Floor care appliance 10 includes a conventional bayonet opening, 12 which permits suction air to move into the floor care appliance 10 and also provides a connection for a hose coupling 14.

As is conventional, hose coupling 14 includes a series of lugs 16A, 16B, 16C that furnish the male members for bayonet coupling connection with opening 12 that includes slots 13A (larger) 13, 13 to accommodate the lugs 16A, 16B, 16C. The hose coupling 14, then, can be inserted in the opening 12 and the hose coupling 14 turned clockwise to lock the hose coupling 14 to the cleaner 10.

As is seen in FIG. 1, lugs 16A (larger), 16B and 16C include taper curved ends 17, 17 that serve as cams when the bayonet coupling is rotated to pull the hose coupling 14 inwardly relative to the cleaner body 10 (FIG. 5) so that a vertical, annular flange 15 on the hose coupling 14 sealing engages against the cleaner body 10, the lugs 16A, 16B, 16C and front face 18 of vertical flange 15, in this position, having a light interference fit with the cleaner body 10.

Hose coupling 14 includes an integral tangentially extending latch finger 20 which is, in a sense, cantilevered from the hose coupling 14 to include an extending connected hinging portion 19 on an indexing portion 21. The hose coupling 14, is of course, ideally formed from plastic. The extending portion 19 is then flexible so that it may be bent by manual pressure on the index portion 21.

Figure 3:
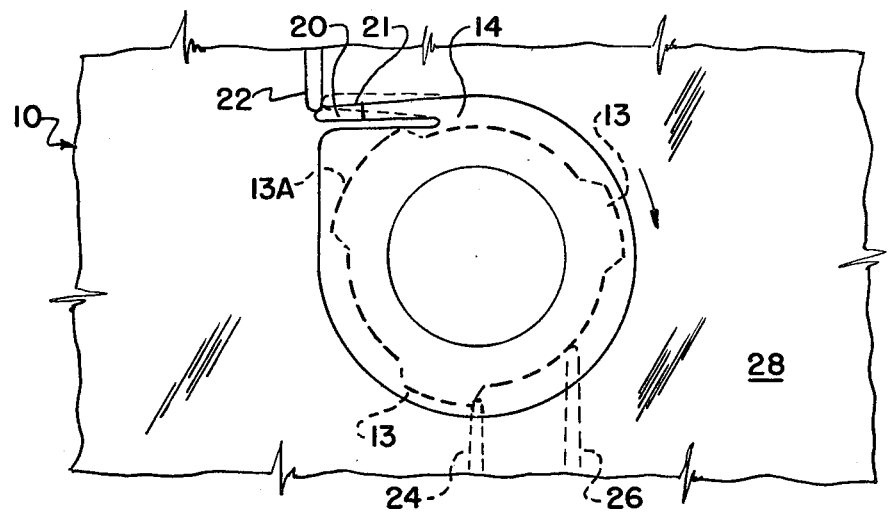
FIG. 3 is a view similar to FIG. 2 with the flexible finger in cammed condition.

As is seen in the locked position, of the hose coupling 14, (FIG. 2), the latch finger 20 is disposed behind (in a rotational sense) a locking rib 22 jutting out of the cleaner body 10. This rib may be integral with the cleaner body and is located so as to interfere abuttingly with the finger 20 once the same has been rotated clockwise beyond it. Counterclockwise rotation of the hose coupling 14 is prevented by the aforesaid abutment. Clockwise rotation of the hose coupling 14 to reach the locked condition of it engages the end of the latch finger 20 (FIG. 3) beneath the integral rib 22, bending the finger and permitting the finger 20 to pass clockwise beyond it at which time it springs upwardly to assume the FIG. 2 position. To release the engaged latch finger 20 manual bending pressure is provided to bend it out of the path of the rib 22 (FIG. 2) so that the hose coupling 14 can be releasably rotated in the counterclockwise direction.

In order to limit rotation of the hose coupling 14 within bayonet opening 12 to the general area of latch operation of the latch finger 20, a pair of ribs 24 and 26 are disposed on an inside face 28 of cleaner body 10. These ribs may be made integral with cleaner body 10 and extend generally axially and vertically within the cleaner body 10 so as to provide obstructions against which one or the other of the lugs 16 abuttingly engages.

As can be seen in FIG. 1, the hose coupling 14 must be rotated slightly counterclockwise so as to aligningly insert the lug 16A into the slot 13A closest to the latch finger 20. The hose coupling 14 is then rotated clockwise engaging as described before the latch finger 20. Limitation of this rotation is occasioned by lug 16C abutting against rib 26 (FIG. 4).

Figure 6:
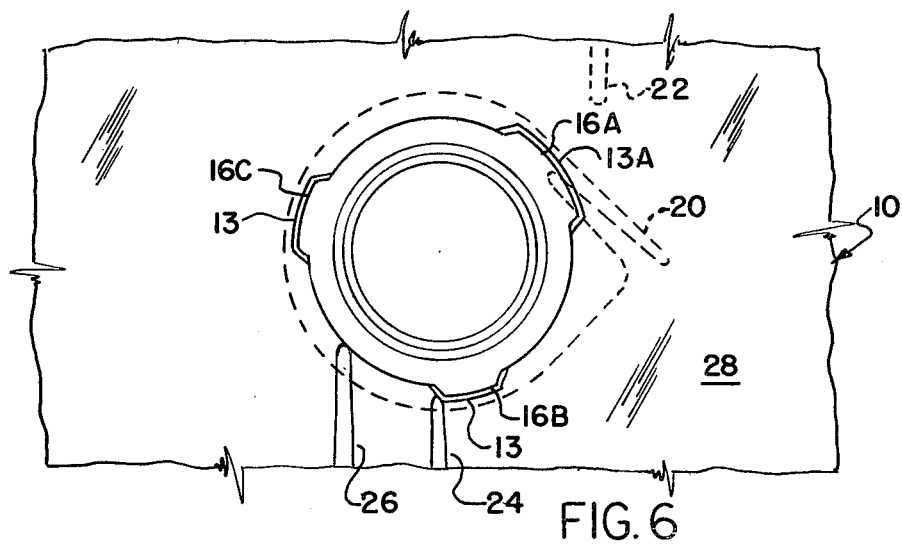
FIG. 6 is a fragmentary view of the structure looking from the middle of the cleaner.

If, on the other hand the hose coupling 14 of FIG. 1 is inserted in the bayonet opening 12 and then rotated counterclockwise the rib 24 abutingly stops rotation by engagement of rib 24 with lug 16B (FIG. 6). Thus, the hose coupling 14 has only a limited rotational arc within bayonet opening 12 to place the latch finger 20 conveniently in proximity to the rib 22.

It should be clear from the description offered that the invention fulfills the objects set out for it. It should be clear that many modifications can be made to it which would still fall within the spirit and purview of the description offered.

What is claimed is:

1. A coupling arrangement including;
   (a) a female coupling part,
   (b) a male coupling part,
   (c) said male coupling part disposed in said female coupling part,
   (d) one of said coupling parts being rotatable to uncouple said male and female coupling parts, and
   (e) one of said coupling parts extending axially and including a cantilevered, deformable straight finger formed integral with it to project transversely from said one of said coupling parts, said straight, transversely extending finger engaging an abutment fixed relative to the other of said coupling parts to prevent said relative rotation between said coupling parts, said finger being deformable away from said abutment to allow relative rotation of said coupling parts.

2. The coupling arrangement of claim 1 wherein:
   (a) said male coupling includes a rounded portion,
   (b) said transversely extending cantilevered finger extends tangentially from said rounded portion for ease in deformation of said finger.

3. The coupling arrangement of claim 1 wherein;
   (a) a cleaner casing is provided,
   (b) said female coupling is formed in said casing and said abutment is formed on said casing,
   (c) whereby said male coupling may be coupled with said female coupling to provide confluent connection between said male coupling and said cleaner casing.

* * * * *